INVENTOR.
BY MARCEL J.E GOLAY
ATTORNEY.

May 5, 1970  M. J. E. GOLAY  3,510,832
FIELD HOMOGENIZATION FOR A REFERENCE SAMPLE IN A LOCK-ON
NUCLEAR MAGNETIC RESONANCE APPARATUS
Filed Jan. 30, 1967  2 Sheets-Sheet 2
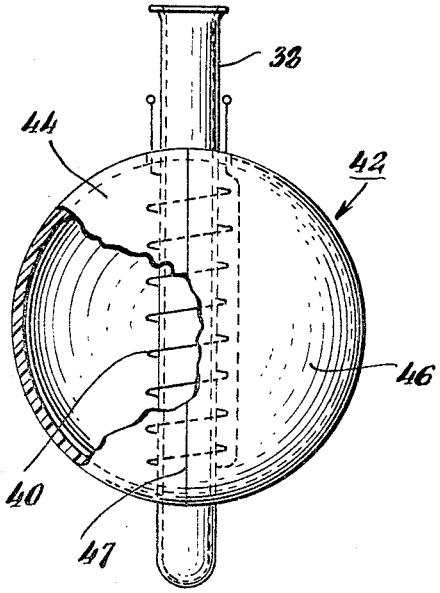
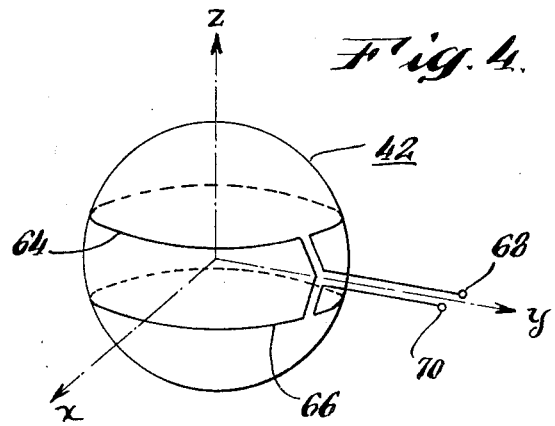
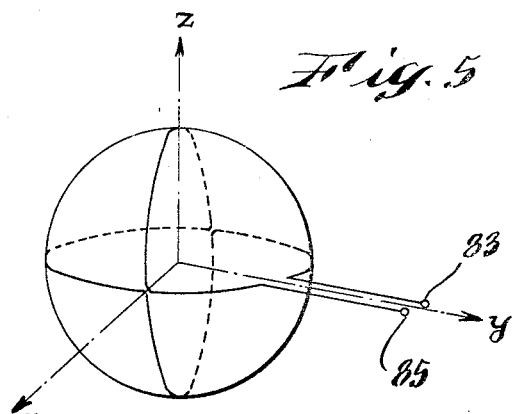
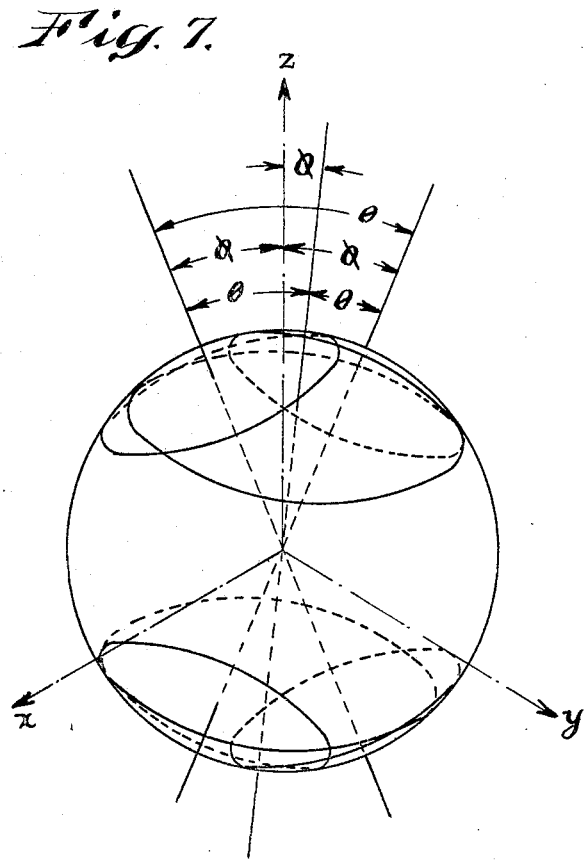
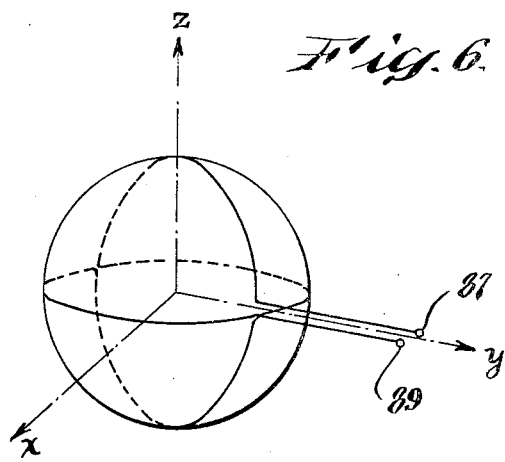
INVENTOR.
BY MARCEL J.E. GOLAY
ATTORNEY.

United States Patent Office 3,510,832
Patented May 5, 1970

3,510,832
FIELD HOMOGENIZATION FOR A REFERENCE SAMPLE IN A LOCK-ON NUCLEAR MAGNETIC RESONANCE APPARATUS
Marcel J. E. Golay, Rumson, N.J., assignor to The Perkin-Elmer Corporation, Norwalk, Conn., a corporation of New York
Filed Jan. 30, 1967, Ser. No. 612,627
Int. Cl. G01n 27/78
U.S. Cl. 324—.5                                7 Claims

ABSTRACT OF THE DISCLOSURE

A nuclear magnetic resonance apparatus having polarizing field homogenizing coils and a lock-on arrangement, includes means for homogenizing the field of a lock-on reference sample. A set of homogenizing coils representative of spherical harmonic functions is positioned at the reference sample and is adapted for homogenizing the polarizing field of the reference sample while causing insignificant disturbances of the homogenized test sample field.

---

This invention relates to nuclear magnetic resonance apparatus. The invention relates more particularly to means for improving the stability of a polarizing magnetic field established in such apparatus.

The use of nuclear magnetic resonance apparatus for performing qualitative analysis of substances is well known. In general, a sample under analysis is positioned in a relatively intense polarizing magnetic field $H_1$, which is generated by a magnet of the apparatus. An alternating magnetic field, $H_2$, which is normal to the field $H_1$ irradiates the atomic nucleus of the sample thereby causing precession of the nucleus. When the frequency ($f$) of the field $H_2$ is equal to the Larmor frequency, a detectable nuclear resonance occurs. The field intensity $H_1$ and frequency ($f$) are related by a constant which is a characteristic of the substance and which is known as the gyromagnetic ratio. The sample can then be identified.

The fabrication of a commercial instrument operating in accordance with these principles has necessitated refinements in nuclear magnetic resonance apparatus to assure the desired degree of accuracy of sample identification. In general, the polarizing field should have a relatively long term stability and a uniformity in intensity equal at least to 1 part in $10^8$. In attempting to satisfy these requisites, nuclear magnetic resonance apparatus have been provided with both a lock-on arrangement adapted for compensating for variations in the polarizing field over a period of time and homogenizing coils for increasing the uniformity of the polarizing field in the vicinity of the test sample. The lock-on means have included a reference sample positioned near the test sample in the field $H_1$ and means for irradiating the reference sample at its Larmor frequency to cause nuclear resonance thereof. Any variation in polarizing field intensity is accompanied by a deviation from nuclear resonance of the reference sample. Circuit means respond to this deviation and cause a compensating shift in field intensity $H_1$ or the irradiating frequency to re-establish resonance. The aforementioned homogenizing coils comprise a plurality of relatively flat coils positioned near pole faces of the magnet and adapted for homogenizing the polarizing field in the relatively small volume of space occupied by the test sample. These coils are desirably orthogonally related in that the field generated by a one of the coils in the vicinity of the test sample does not substantially alter that field component in the vicinity of the test sample which is simultaneously established by another of the coils.

Homogenization of the polarizing field in the vicinity of the test sample is affected to an order of 1 part in $10^8$, as previously indicated. While this uniformity is achieved within a relatively small volume centered at the air gap center, it is found that the field inhomogeneity at some displacement from the test sample location where it might be desired to place a reference sample can be increased to as much as 1 part in $10^4$. For purposes of increased lock-on sensitivity and corresponding analysis accuracy, it is desirable to decrease the inhomogeneity of the field in the vicinity of said reference sample to at most 1 part in $10^6$. It is further desirable to provide this increased uniformity in the vicinity of the reference sample while maintaining the homogenized field in the vicinity of the test sample substantially unaltered.

Accordingly, it is an object of this invention to provide a nuclear magnetic resonance apparatus having an improved lock-on arrangement.

Another object of the invention is to provide a nuclear magnetic resonance apparatus having field homogenizing and field compensating means and which provides improved field uniformity in the vicinity of a reference sample.

A further object of the present invention is the provision of a reference sample field homogenizing means which homogenizes the field of the reference sample while leaving the homogenized field in the vicinity of the test sample substantially unaltered.

In accordance with features of the present invention, a nuclear magnetic resonance apparatus having a lock-on field compensating arrangement includes a first polarizing field homogenizing means adapted for increasing the uniformity of the polarizing field $H_1$ in the vicinity of a test sample, and a homogenizing means for increasing the uniformity of the polarizing field in the vicinity of the reference sample. The reference sample homogenizing means comprises a plurality of electroconductors positioned on a surface located at the reference sample and arranged for increasing the homogeneity of the reference field while leaving substantially unaltered the homogenized field in the vicinity of the test sample.

These and other objects and features of the invention will become apparent from the following specifications and drawings wherein:

FIG. 3 is a diagram of a reference sample holder for use with the apparatus of FIG. 1 and illustrating a reference sample homogenizing means;

FIGS. 4, 5 and 6 are diagrams of a surface of the sample holder of FIG. 3 and illustrating the component windings of a set of field homogenizing windings for use with the sample holder of FIG. 3; and FIG. 7 is an alternative arrangement of homogenizing windings positioned on the surface of the sample holder of FIG. 3.

Figure 1:
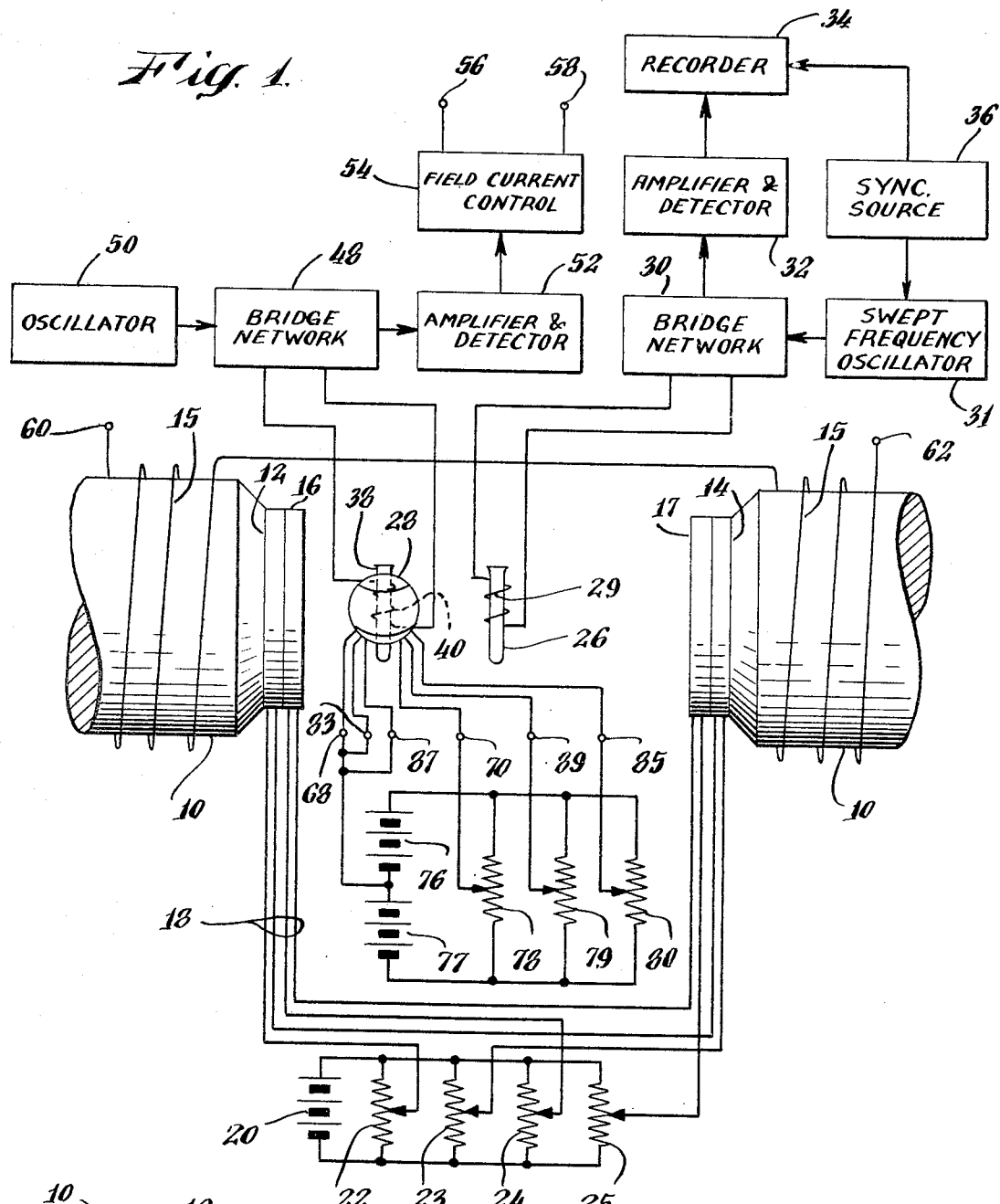
FIG. 1 is a diagram, partly in block form, illustrating a nuclear magnetic resonance apparatus of a type having polarizing field homogenizing means and employing a lock-on field compensating means constructed in accordance with one embodiment of the present invention.
Figure 2:
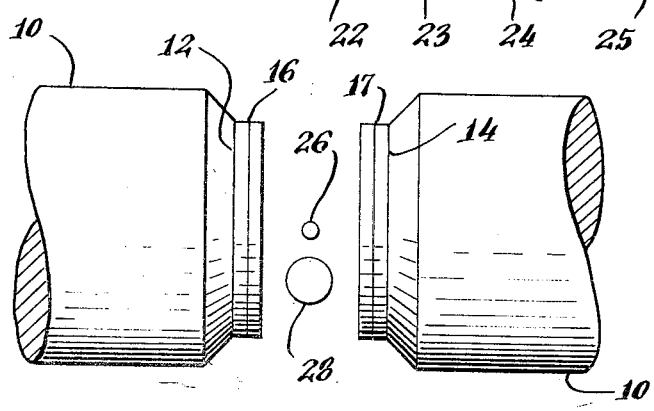
FIG. 2 is a simplified plan view of the arrangement of FIG. 1, illustrating one particular spatial arrangement of test and reference samples in the field of the magnet of FIG. 1.

Referring now to FIG. 1, an NMR apparatus is shown to include a partially illustrated permanent magnet 10 having pole faces 12 and 14 between which a relatively intense polarizing field $H_1$, is established. A corrective field winding 15 is positioned on the magnet. As described in greater detail hereinafter, this corrective winding is adapted to provide relatively small compensating variations in the intensity of the polarizing field. The polarizing field is required to have a relatively high degree of uniformity. For example, deviations in the field intensity of an order greater than 1 part in $10^8$ are undesirable. Field homogenizing means are provided in order to obtain the desired uniformity. These means include flat homogenizing coils 16 and 17 positioned at the pole faces 12 and 14 respectively. The homogenizing coils comprise discs having a plurality of conductively insulated electroconductor windings positioned thereon and adapted for generating substantially orthogonally related field components for correcting the field at a desired point between the pole faces. One specific arrangement of the homogenizing coils is described in my copending U.S. application Ser. No. 694,427, filed on Nov. 4, 1957. The various leads extending from the homogenizing coils, and indicated generally as 18, are connected to a source of potential 20 via potentiometers 22, 23, 24 and 25 in a manner for controlling the amplitude and the direction of current flowing in the homogenizing windings.

The NMR apparatus further includes a test sample holder 26 positioned between the pole faces 12 and 14 and containing a sample of an unknown substance which is to be identified by the apparatus. Various sample holders for use with the apparatus are known in the art and for purposes of simplicity in the drawings, the sample holder 26 is indicated to be a test tube. A second sample holder, indicated generally as 28, is also positioned between the pole faces 12 and 14. This latter sample holder which is described in greater detail hereinafter, forms part of a lock-on arrangement. The test sample holder 26 includes a pickup coil 29 which forms one arm of a bridge network 30. A variable frequency RF oscillator 31 is coupled to the network 30 and is swept through a frequency range over a time interval, $t_1$. The voltage applied to the network 30 by this generator causes a current to flow in the coil 29 and a magnetic field $H_2$ is thereby generated normal to the field $H_1$. At the Larmor frequency ($f$) of a sample component, the test sample exhibits nuclear resonance, in a known manner, and absorbs energy from the coil 29. The bridge network thereby becomes unbalanced. This unbalance is detected and amplified by a detector and amplifier stage 32. A recording indicating means 34, such as a chart recorder, is provided and is synchronized with the sweep of the oscillator 31 during a time interval $t_1$ by electrical signals from a synchronizing source 36. The recording indicator thereby provides a spectrogram from which the components of the sample may be identified.

As indicated previously, the polarizing field is subject to variations and a lock-on arrangement is provided in order to compensate for these variations. The lock-on reference sample holder 28 of FIG. 1 is illustrated in greater detail in FIG. 3 and includes a tubular sample container 38 which is closed at one end for containing a reference sample. A pickup coil 40 is positioned about the container 38 and this arrangement is positioned in, and, extends through a body 42 which supports homogenizing coils in the vicinity of the reference sample. The body 42 is shown to be hollow and spherical and to be formed of two electrically insulative hemispherical members 44 and 46 which are cemented together at a surface 47. The hemispheres each contain cut-out segments, not shown, which adapt the sphere for receiving the tubular member 38. Field homogenizing coils, described in greater detail hereinafter, are formed on the body 42. The body 42 is oriented in the polarizing field in a manner for providing that a magnetic field established by a current flowing in the coil 40 is normal to the polarizing field.

Pickup coil 40 is arranged as a component of a bridge network 48. An RF voltage at the Larmor frequency of the reference sample is derived from an oscillator 50 (FIG. 1) and is applied to the bridge network 48. The reference sample accordingly exhibits nuclear resonance and absorbs energy from the coil 40. As variations occur in the intensity of the polarizing field, less energy is absorbed and the bridge network becomes unbalanced. This unbalance is detected and amplified by the stage 52. An output signal proportional to the unbalance is coupled from the stage 52 to a field circuit control stage 54. The output terminals 56 and 58 of this stage are connected to terminals 60 and 62 respectively of the corrective field winding 15. The stage 54 causes a DC current to flow in the winding 15 and the magnitude of this current is caused to vary from a pre-established nominal value in accordance with the variation from resonance in a manner for reestablishing nuclear resonance of the reference sample.

A set of three corrective coils for homogenizing the polarizing field within the body 42 is illustrated in FIGS. 4, 5 and 6. For purposes of clarity in the drawings, each winding of the set is illustrated independently in these figures. It is understood that the composite set of homogenizing coils includes each of these windings positioned on the body 42 and orientated with respect to the $x$, $y$, and $z$ axes as shown in FIGS. 4, 5 and 6. Each winding comprises an electroconductor cemented to the sphere, electrically insulated from other windings of the set and arranged in a configuration adapted for providing a desired homogenizing corrective field component within the sphere.

As disclosed in my copending U.S. patent application Ser. No. 694,427, filed on Nov. 4, 1957, the field at the center of an imaginary sphere, has the property that the Laplacian of the field potential F, vanishes: $\Delta^2 F = 0$. The spherical harmonic functions are a group of functions the Laplacian of each of which vanishes and each of which represents a contribution to the field at the sphere center. By generating corrective fields, which can also be represented by spherical harmonics, then, the field uniformity within the sphere can be controlled. The field representing harmonic functions can be closely approached by a current flowing on the surface of a sphere and along a locus at which the function vanishes, i.e., where the function equals zero. The spherical harmonic functions of primary interest are:

$$\text{Zonal } 2z^2 - x^2 - y^2 \qquad (1)$$

$$\text{First tesseral } x \cdot z \qquad (2)$$

$$\text{Second tesseral } y \cdot z \qquad (3)$$

The locus on the sphere where these functions vanish describes an arrangement of the desired windings. This set of windings is orthogonal in the sense that the integral of the product of the derivitives with respect to $z$, presumed to be the direction of the main field, of any two of these harmonic functions, taken over a sphere centered at the origin of coordinates, vanishes. In addition, the set is semi-complete in the sense that any magnetic inhomogenity describable by a second degree zonal or tesseral harmonic can be corrected by means of this cell set, while sectorial inhomogenities cannot be so corrected. However, the absence of sectorial correction is, in general of no importance since the magnetic components corresponding to these sectorial harmonics are normal to the main field and affect it in a quadratic manner only.

The winding of FIG. 4 represents the locus where the harmonic of Equation 1 vanishes when the distance between the two symmetric loops 64 and 66 is $D/\sqrt{3}$, where D is the sphere diameter. On the other hand, it is adapted for generating no 4th degree zonal harmonics when said loops 64 and 66 are spaced apart a distance equal to $\sqrt{3/7} \cdot D$. The winding of FIGS. 5 and 6, representing the locii where the harmonics of Equations 2 and 3 respectively vanish, each produce 4th degree tesseral harmonics. However, this interference is generally tolerable. Although not specifically illustrated, the winding configuration of the electroconductors of FIGS. 5 and 6 are suitably altered near the contact surface 47 of the hemisphere surfaces at diametrically opposite positions to adapt the sphere for receiving the container 38. Output terminals 68 and 70 of the zonal windings of FIG. 4 are coupled to a center tap between a pair of batteries 76 and 77 in FIG. 1 and to an adjustable arm of a potentiometer 78. The DC potential applied across this potentiometer by the battery provides for a current flow in the winding and the adjustment of the arm of the potentiometer 78 varies both the magnitude and the direction of zonal coil current. The corrective zonal field components are thereby established. Similarly, terminals 83 and 85 are of the first tesseral winding (FIG. 5) are coupled to the common tap between the batteries 76 and 77 and to an adjustable arm of a potentiometer 79 while terminals 87 and 89 of the second tesseral winding (FIG. 6) are coupled to the common junction between batteries 76 and 77 and to an adjustable arm on a potentiometer 80. In view of the close proximity of those homogenizing windings to the reference sample, the magnitude of current flowing in these windings is relatively low and disturbance of the homogenized test sample field is accordingly low.

FIG. 7 illustrates an alternative homogenizing winding arrangement positioned on the sphere and which advantageously avoids the generation of 4th degree zonal and 4th degree tesseral components. This arrangement utilizes the advantages residing in the winding configuration of FIG. 4. As previously indicated, an electroconductor arrangement of the FIG. 4 type does not itself generate 4th degree spherical harmonics which might interfere with the attainment of suitable field homogenity within the sphere. In FIG. 7, a set of three conductively insulated windings of the FIG. 4 type (i.e., $2z^2-x^2-y^2$) are provided and are symmetrically arranged about the $z$ axis and spaced therefrom by an angle $\phi$. Each of these axes are mutually spaced by an angle $\theta$, and the details of the connection shown in FIG. 4 have been omitted in order to simplify the figure. When a pair of winding coils such as are illustrated in FIG. 4 has its axis tilted by an angle $\phi$ from the $z$ axis toward the $x$ axis, a simple change of coordinates can show that the zonal harmonic of this tilted pair is of the form:

$$(3\cos^2\phi - 1)\left(z^2 - \frac{x^2}{2} - \frac{y^2}{2}\right)$$
$$+3\sin 2\phi \cdot x \cdot z + 3/2 \sin^2\phi(x^2-y^2)$$

As is obvious, the first term of this equation is of zonal harmonic form, the second term is of first tesseral form, and the last term is a sectorial. This winding thus provides field potentials representable by the linear combination of zonal and tesseral harmonic potentials indicated by this equation. Likewise, if a second pair of winding coils is placed in the location obtained by rotating the first pair 120° about the $z$ axis, the harmonic generated by the second pair will be of the form:

$$(3\cos^2\phi - 1)\left(z^2 - \frac{x^2}{2} - \frac{y^2}{2}\right) - \frac{3}{2}\sin 2\phi \cdot x \cdot z$$
$$-3/4 \sin^2\phi(x^2-y^2) - 3\sqrt{3}\sin\phi\cos\phi \cdot y \cdot z + \frac{3\sqrt{3}}{2} x \cdot y$$

As is obvious, the first term of this equation is of zonal harmonic form, the second term is of first tesseral form, and the fourth term is of second tesseral form. The remaining terms are of sectorial form. This winding also provides field potentials representable by a linear combination of zonal and tesseral harmonic potentials, as indicated by this equation. The derivitives of these two harmonics with respect to $z$ give the intensity of the corrective field generated in the $z$ direction and are, respectively:

$$B_{z,1} = 2(3\cos\phi - 1)z + 3\sin 2\phi x$$

$$B_{z,1} = 2(3\cos\phi - 1)z - \frac{3}{2}\sin 2\phi \cdot x - 3\sqrt{3}\sin\phi\cos\phi \cdot z$$

When averaged over a sphere centered at the origin, the product $B_{z,1} \cdot B_{z,2}$ has the form:

$$-4(1-3\cos^2\phi)^2 + 9/2 \sin^2 2\phi = -4 + 42\cos^2\phi - 54\cos^4\phi$$

and vanishes when either:

$$\cos\phi = \sqrt{2/3} \qquad \phi = 35.25°$$

or $$\cos\phi = 1/3 \qquad \phi 70.53°$$

For these two cases, the angle $\theta$ between the axes of the two pair of coils has the respective values:

$$\theta = 60°$$

and $$\theta = 109.47°$$

Now, if these pairs of coils are arranged symmetrically about the $z$ axis, with their axes making angles of 35.26° with the $z$ axis and angles of 60° with each other, the adjustment of the amplitude of currents flowing in these coils will be substantially independent when providing field inhomogeneity. The coil set of FIG. 7 comprising the three mutually orthogonal coils, suitably weighed combinations of which can serve to generate any combination of zonal or tesseral second degree harmonics, is therefore semi-complete in the sense defined above. In addition to having the property that it does not generate 4th degree harmonics, this arrangement is further advantageous in providing an only slightly obstructed mounting of a sample support tube having a diameter small when compared to the sphere diameter.

While I have illustrated and described a particular embodiment of my invention, it will be understood that various modifications may be made therein without departing from the spirit of the invention and the scope of the appended claims.

I claim:
1. A nuclear magnetic resonance instrument comprising:
   means including a magnet having oppositely disposed pole faces for establishing a relatively intense magnetic polarizing field;
   homogenizing coil means positioned at said pole faces for homogenizing nonuniformities in the polarizing field in a relatively small volume of space between said pole faces;
   means for positioning a test sample between said pole faces;
   means for applying an alternating magnetic field to the test sample at a frequency for causing gyromagnetic resonance of the test sample;
   a reference sample holder including a spherically shaped body positioned between said pole faces;
   lock-on means, including a reference sample positioned within said spherically shaped body, for causing said reference sample to exhibit nuclear magnetic resonance and for sensing variations in reference sample resonance accompanying variations in the intensity of the polarizing field and for providing a compensating variation on the magnetic field intensity or irradiating frequency for maintaining resonance of said test sample, and
   means, including a plurality of orthogonally related homogenizing windings mounted on said spherically shaped body and adapted for homogenizing the polarizing field in the vicinity of the reference sample, said windings arranged on said sphere for generating zonal and tesseral potentials of second degree.

2. A nuclear magnetic resonance instrument comprising:
   means, including a magnet having oppositely disposed pole faces, for establishing a relatively intense magnetic polarizing field therebetween;
   homogenizing coil means comprising a plurality of relatively flat coils positioned at said pole faces for homogenizing nonuniformities in a relatively small volume of space between said pole faces;

means for positioning a test sample between said pole faces;

means for applying an alternating magnetic field to the test sample at a frequency for causing gyromagnetic resonance of the test sample;

lock-on means, including a reference sample holder positioned between said pole faces for causing said reference sample to exhibit nuclear magnetic resonance and for sensing variations in reference sample resonance accompanying variations in the intensity of the polarizing field and for providing a compensating variation in the magnetic field intensity or irradiating frequency for maintaining resonance of said test sample; said reference sample holder including a support body having a plurality of orthogonally related reference sample homogenizing coils positioned on a surface thereof and arranged for homogenizing nonuniformity of the polarizing field in the vicinity of the reference sample holder each of said windings arranged for establishing a potential represented by a linear combination of zonal and tesseral potentials; and means for causing a current to flow in said reference sample homogenizing coils for homogenizing the field in the vicinity of said reference sample.

3. The apparatus of claim 2 wherein said plurality of reference sample homogenizing windings comprise three windings arranged for generating field components representative of zonal, first tesseral, and second tesseral functions.

4. The apparatus of claim 2 wherein said plurality of reference sample homogenizing windings comprise three windings arranged for generating field components representative of zonal functions, each of said windings including a pair of spaced apart circular loops having an axis, the axis of said loops each mutually spaced apart by an angle $\theta$ and each spaced from a reference axis by an angle $\phi$.

5. The apparatus of claim 3 wherein said sample holder includes a sample container, a pickup winding positioned about said container, and a spherical support body partly surrounding said container and having a surface upon which said reference sample homogenizing coils are 6. The apparatus of claim 4 wherein $\theta=60°$ and $\phi=35.26°$.

7. The apparatus of claim 4 wherein $\theta=109.45°$ and $\phi=70.53°$.

References Cited

UNITED STATES PATENTS

| 3,034,040 | 5/1962 | Williams | 324—0.5 |
| 3,199,021 | 8/1965 | Anderson | 324—0.5 |

FOREIGN PATENTS

| 713,217 | 7/1965 | Canada. |

RUDOLPH V. ROLINEC, Primary Examiner

M. J. LYNCH, Assistant Examiner

U.S. Cl. X.R.

317—123

UNITED STATES PATENT OFFICE

CERTIFICATE OF CORRECTION

Patent No. 3,510,832　　　　　　　　　　Dated May 5, 1970

It is certified that error appears in the above-identified patent and that said Letters Patent are hereby corrected as shown below:

Column 8, line 12, add the word --positioned.-- at the end of the line, and insert a period after the added word.

SIGNED AND
SEALED
NOV 3 1970

(SEAL)
Attest:

Edward M. Fletcher, Jr.
Attesting Officer

WILLIAM E. SCHUYLER, JR.
Commissioner of Patents